United States Patent [19]
Volontieri

[11] 3,899,730
[45] Aug. 12, 1975

[54] METHOD OF ELIMINATING RISK OF DISCHARGE OF A BATTERY IN AN ELECTRICAL INSTALLATION FOR A MOTOR VEHICLE AND AN APPARATUS FOR EFFECTING THE SAME

[75] Inventor: Aldo Volontieri, Milan, Italy
[73] Assignee: Alfa Romeo S.p.A., Milan, Italy
[22] Filed: June 20, 1974
[21] Appl. No.: 481,472

[30] Foreign Application Priority Data
Dec. 12, 1970 Italy..........................32944/70

Related U.S. Application Data
[63] Continuation-in-part of Ser. No. 205,536, Dec. 7, 1971.

[52] U.S. Cl. .................. 320/61; 219/203; 322/90
[51] Int. Cl............................................. B60l 1/02
[58] Field of Search ........... 320/61; 322/90, 77, 27; 219/202, 203, 279

[56] References Cited
UNITED STATES PATENTS
3,132,228   5/1964   Eisler .................... 219/202
3,440,398   4/1969   Nilssen ................... 219/202
3,525,853   8/1970   Nilssen ................. 219/279 X
3,752,348   8/1973   Dickason et al. ......... 219/203

FOREIGN PATENTS OR APPLICATIONS
1,047,303   11/1966   United Kingdom.............. 320/61

*Primary Examiner*—J. D. Miller
*Assistant Examiner*—Robert J. Hickey
*Attorney, Agent, or Firm*—Holman & Stern

[57] ABSTRACT

A method and an apparatus of eliminating the risk of discharge of a battery in an electrical installation for a motor vehicle wherein the output of an A.C. alternator having a controllable D.C. field excitation winding is connected directly to a set of selected A.C. high power consuming devices, such as windshield heating resistors, as well as to ther D.C. loads through rectification means and the intermediary of a storage battery. The A.C. power supplied directly by the alternator to the selected A.C. load devices can be controlled and maintained within limits by regulating the drive to the D.C. field excitation winding.

1 Claim, 8 Drawing Figures

METHOD OF ELIMINATING RISK OF DISCHARGE OF A BATTERY IN AN ELECTRICAL INSTALLATION FOR A MOTOR VEHICLE AND AN APPARATUS FOR EFFECTING THE SAME

This is a continuation-in-part of a co-pending application Ser. No. 205,536 filed on Dec. 7, 1971.

BACKGROUND OF THE INVENTION

This invention relates to an electrical installation for a motor vehicle and more particularly, it relates to an apparatus and a method of eliminating the risk discharge of the battery in an electrical installation for a motor vehicle powered by an internal combustion engine.

In recent years, there has been a tendency towards the utilization of alternators instead of dynamos or D.C. generators particularly on motor vehicles driven by internal combustion engines. These alternators, similar to the dynamos, are driven by the internal combustion engine of the motor vehicle so that their rotational speed varies during the operation of the vehicle.

Such alternators provide a D.C. voltage by means of an internal rectifier, so as to allow the storage battery to be charged as the battery delivers D.C. power to the various loads of the vehicle.

Due to the fact that the conversion of alternating current into direct current takes place with a certain reduced efficiency, in that consequential losses induce heating of the above-mentioned rectifiers (i.e., of the semi-conductor type), there arises a need for facilitating their cooling by appropriate ventilation, particularly when the system is to deliver high power. Further, when an adverse circumstance occurs, such as when the motor vehicle is operating at low speed, the typical prior art system ceases to function properly in that the output voltage drops, and even a few high power consuming loads such as resistence heaters and fans could cause a partial or entire discharge of the storage battery with accompanied drawbacks in the operation of the vehicle as a whole. This adverse circumstance is usually noted when attempting to start the vehicle when it is cold.

In an effort to improve operation, thought has been given to driving high power consuming loads with an A.C. voltage directly from the alternator, the remaining loads being powered in a conventional manner with D.C. voltage from the rectifier bank of the alternator. An example of this type of circuit arrangement can be found in the British Pat. Specification No. 1,047,303. This system, however, suffers a severe drawback in that the alternator utilized therein is of the permanent-magnet type and, as such, inherently provides an unregulated A.C. voltage output which varies with the speed of rotation of the engine driving the alternator, and thus a variable A.C. drive to the load devices connected thereto.

With some loads, such as resistence windshield heaters, it is necessary to keep the A.C. drive thereto within closely regulated ranges and with loads having this requirement, systems of the type described in said British Patent cannot readily be used.

SUMMARY OF THE INVENTION

It is a primary object of the invention to provide a system of the general type described which is capable of applying a controlled and regulated A.C. drive to high power consuming loads, thus obviating this severe prior art disadvantage.

Another object of this invention is to provide a method of eliminating the risk of discharge of a battery in an electrical installation for a motor vehicle powered by an internal combustion engine.

Another object is to provide an electrical installation for a motor vehicle powered by an internal combustion engine which permits the connection thereto of selected electrical-power consuming devices of the vehicle so as to be operated from a constant and regulated alternating current supply directly from an A.C. alternator rather than by direct current supplied from the storage battery, the system comprising an A.C. alternator driven by the engine and having a controllable D.C. field excitation winding, a voltage regulator associated with the controllable D.C. field excitation winding for maintaining the output voltage of the A.C. alternator at a constant and regulated voltage, the storage battery being connected to be charged by the A.C. alternator through current-rectifying means, a first set of selected electricalpower consuming devices or loads being connected directly to the battery, and a second set of electrical-power consuming devices such as windshield heating resistors being connected directly to the constant and regulated alternating current supplied from the A. C. alternator.

Another object is to provide an electrical installation having a reduced A.C. alternator power requirement, since the power required by various high powered consuming loads does not have to pass through the rectifier arrangement and thus, the rectification losses are avoided.

Yet another object is to provide an electrical installation having a reduced thermal stress on the rectifier.

Yet another object is to provide an electrical installation for starting the storage battery recharging at a lower speed of rotation of the alternator.

Still another object is to provide an electrical installation which eliminates the danger of discharge of the storage battery when certain electrical-power consuming devices are inserted into the circuitry when the engine is either idling or stationary, as when the installation is being fed by the storage battery.

Yet another object is to provide an electrical installation having a reduced value of the current fed through the rectifying means, and thus allow the utilization of rectifying means of reduced power.

According to the preferred embodiment of the present invention, the alternator has a controllable D.C. field excitation winding and a current-rectifier means as is conventional, and is equipped with a first set of terminals providing the D.C. output, as well as a second set of terminals which are connected directly to the stator winding in order to deliver alternating current. These latter terminals are connected in accordance with the invention to selected electrical-power consuming devices, more particularly of a resistive type such as a windshield heater, which are fed by alternating current.

These electrical-power consuming devices must be proportioned so that their proper operation requires only the utilization of the A.C. voltage as delivered by the alternator at the second set of terminals.

The devices (which are especially adapted to be inserted in the circuitry in the above-discussed way) are A.C. high power consuming devices which represent a high load so as to have a considerable bearing on the stability of the alternator-storage battery assembly. By so connecting these devices directly to the A.C. terminals emerging from the alternator, the operation of these devices is made possible without modifying the state of charge of the batteries. Consequently, the risk of exceedingly high rates of discharge of the batteries is thus prevented.

An example of the A.C. high power consuming devices of the kind referred to above is vehicle-glass heat resistors which, according to the present invention, are connected to form a singlephase or three-phase load consistent with the circuitry of the A.C. alternator having a controllable D.C. field excitation winding. Such an A.C. high power consuming device is driven from the induced (output) voltage of the alternator which is regulated and held constant irrespective of the RPM thereof. This is due to the fact that the voltage regulator can be inserted serially or parallelly with the D.C. field excitation winding of the alternator for controlling its output voltage as is well-known to those skilled in the art, which is evidenced by the Larson Patent (U.S. Pat. No. 3,219,903).

Thus, under these conditions, the battery can operate conventionally even though its charging takes place with a certain delay.

In addition, it is possible to feed all those A.C. high power consuming devices or loads such as fan heaters, defrosting heaters and others with A.C. directly from the alternator of the vehicle which loads are only intended to be operated with the engine is running and is rotated at a rate which exceed the minimum RPM at which the alternator supplied an appropriate voltage and which is usually well below idling RPM of the engine of the vehicle.

More particularly, for a few of the A.C. high power consuming devices, it is possible to balance the increased load on the internal impedance of the alternator by inserting, simultaneously with the load, appropriate power-factor-improving capacitors.

These and other objects and advantages of the present invention will be more apparent from the following description taken in conjunction with the accompanying drawings wherein a few of the preferred embodiments are clearly illustrated.

DETAILED DESCRIPTION OF THE PREFERRED EMBODIMENTS

Figure 1:
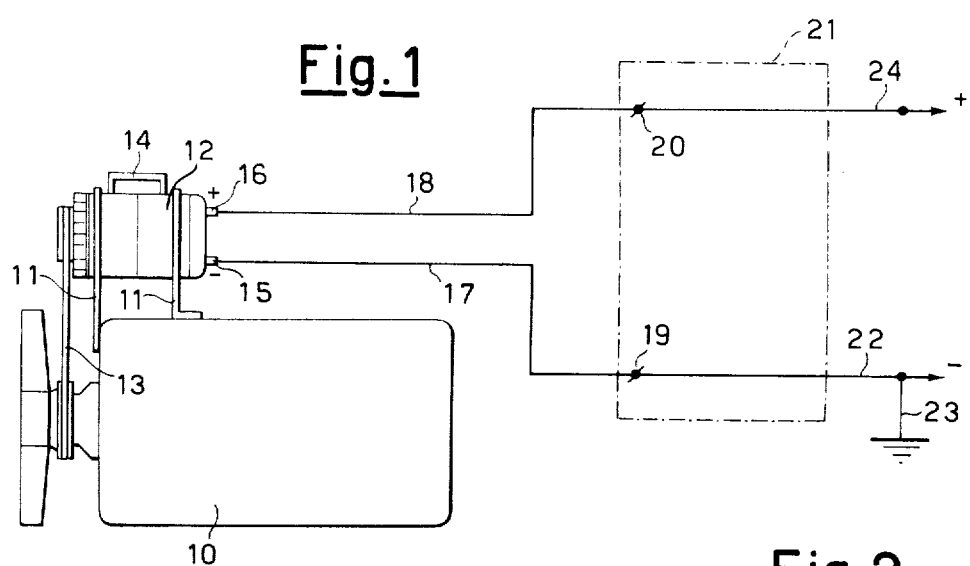
FIG. 1 depicts a commercial diagrammatical view of an electrical installation for a motor vehicle, according to the present invention.

Referring now to FIG. 1 of the drawings, the reference numeral 10 designates an internal combustion engine which is mounted on a vehicle (not shown) and is fastened thereto by means of supports 11. The combustion engine has disposed thereon an alternator 12 driven rotatably by the engine via the intermediary of a belt transfer mechanism 13.

The alternator 12 is equipped with a terminal board 14 and additional terminals 15 and 16, each of the additional terminals being electrically connected with wire leads 17 and 18 to the poles 19 and 20, respectively, of a storage battery 21. The wire leads 17 and 18 are extended into wire leads 22 and 24, respectively. The wire lead 22 is connected to ground at 23, whereas the wire lead 24 is used to feed the electrical-power consuming devices which require D.C. supply.

Figure 2:
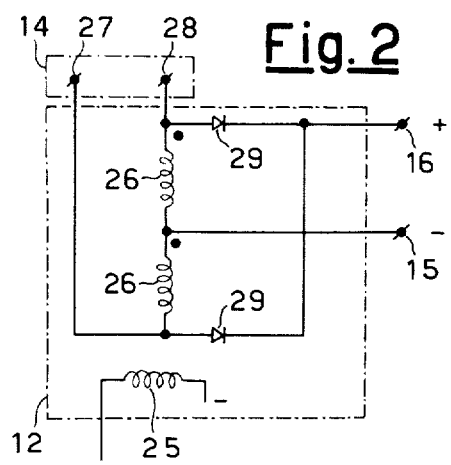
FIG. 2 depicts a wiring diagram of the electrical installation as shown in FIG. 1 when the alternator is a single-phase type.

Referring now to FIG. 2, there is shown a schematic circuit diagram of the alternator 12 when it is a single-phase type. The alternator may be of any well-known type having a controllable D.C. field excitation winding 25 and armature windings 26. The armature windings are connected to terminals 27 and 28 disposed within the terminal board 14. The induced (output) voltage that is generated in the armature windings 26 is controlled by the amount of field current passing through the controllable D. C. field excitation windings as is well-known to those skilled in the art. A voltage regulator 51 of any conventional construction is connected in series with the D.C. field excitation winding of the alternator, as is also well-known, for this purpose. The voltage regulator may also be connected in parallel with the D.C. field excitation winding.

The ends of the armature windings 26 are also connected through rectifying diodes 29 to the positive terminal 16, and a center tap of the same windings is connected to the negative terminal 15. Thus, the electrical circuitry of the alternator comprising a current-rectifying device is of the conventional type with the exception of the additional terminals 17 and 28, which are utilized to supply alternating current for selected A.C. high power consuming devices (i.e., resistive loads) as will be fully described hereinafter. The D.C. circuitry which is terminated by the terminals 15 and 16, is wholly conventional and has been described diagrammatically, inasmuch as it can easily be provided with all-conventional devices such as the voltage regulator, suitable pilot lamps and the like as is well-known to those skilled in the art.

Figure 3:
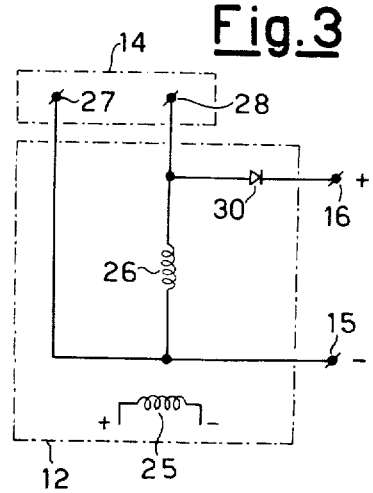
FIGS. 3 and 4 depict alternative embodiments of the diagram shown in FIG. 2.

In FIG. 3, there is shown another suitable electrical circuit for the alternator, wherein a rectifying diode 30 is inserted between one end of the armature winding 26 and the positive terminal 16, or as the negative terminal is merely connected to the other end of the winding 26.

Figure 4:
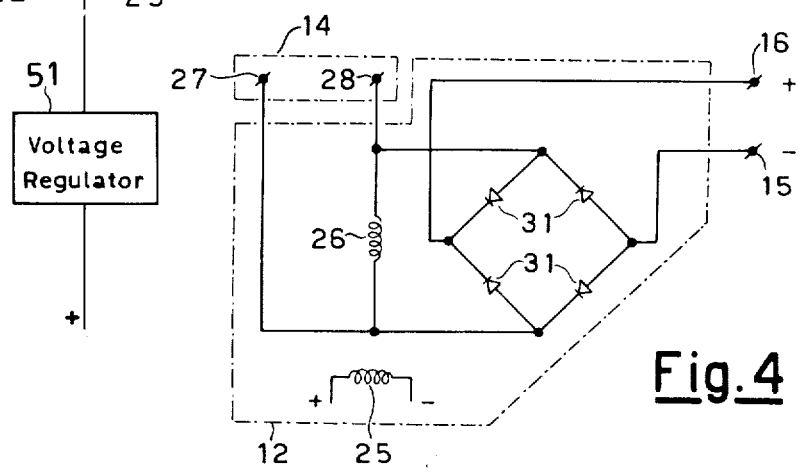

In FIG. 4, there is shown a further embodiment of the electrical circuitry of the alternator 12 wherein a full-wave bridge rectifier is utilized, which consists, in a quite conventional way, of four diodes 31: one pair of opposite apexes of the bridge are connected to the ends of the armature winding 26, the other pair being connected to terminals 15 and 16.

Figure 5:
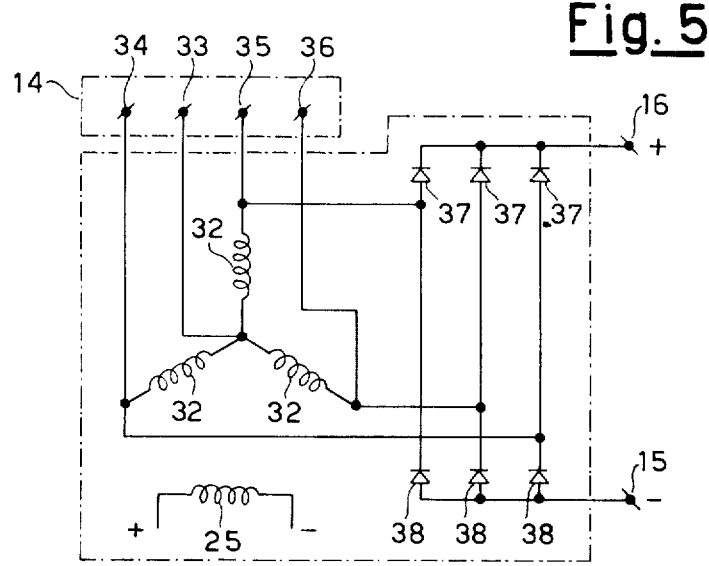
FIG. 5 is a schematic circuit diagram of the electrical installation as shown in FIG. 1 when the alternator is a three-phase type.
Figure 6:
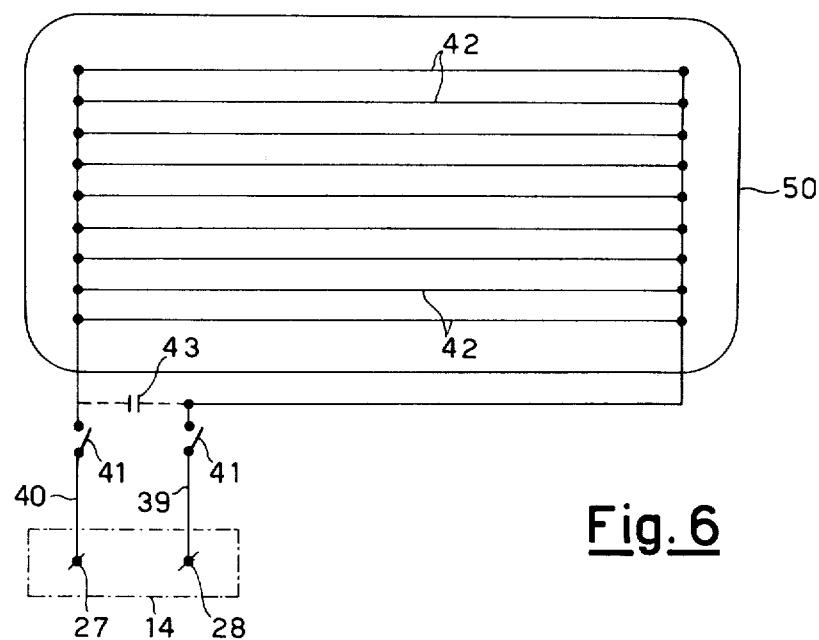
FIGS. 6, 7 and 8 show schematic circuit diagrams of A.C. high power consuming devices or loads.

Referring now to FIG. 5, there is shown a schematic circuit diagram for a three-phase alternator having armature windings 32 which are Y-connected, the neutral point and the ends of each armature winding connected to terminals 33, 34, 35 and 36 of the terminal board 14. Each end of the armature windings is also connected through rectifying diodes 37 and 38 to the terminals 15 and 16.

FIGS. 6 through 9 depict diagrammatically how it is possible to connect, in the electrical installation of the present invention, the second set of selective electrical-power consuming devices as exemplified by heating resistors for the glass windows of the vehicle which require a regulated and constant voltage.

In the case of a single-phase type alternator, the terminals 27 and 28 (FIG. 6) of the terminal board 14 are connected through circuit breakers 41 with wire leads 39 and 40 which are connected, in turn, with a plurality of resistance wires 42, which for example can be embedded in a glass plate or window 50 and intended to heat the same by virtue of the current flowing therethrough. A power-factor-proving capacitor 43 can be provided between the wire leads 39 and 40.

Figure 7:
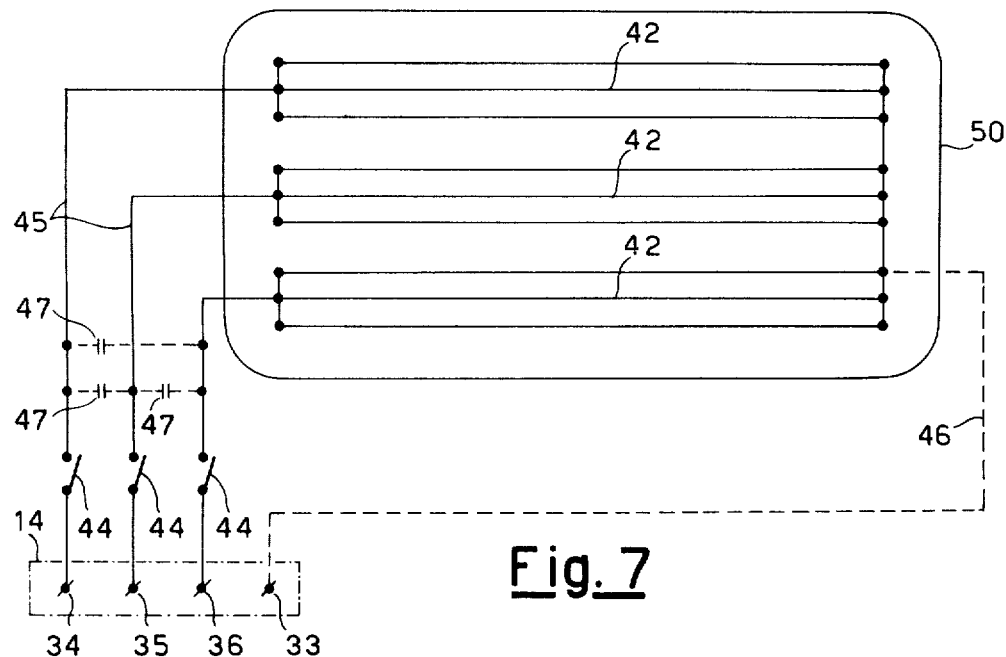

In the case of three-phase types of alternators, the resistance wires 42 can be Y-connected (as shown in FIG. 7), the apexes being connected to wire leads 45 to the terminals 34, 35 and 36, the central point being connected by a wire lead 46 to the neutral terminal 33. Switches 44 control the wire leads 45 and the power factor is improved by capacitors 47.

Figure 8:
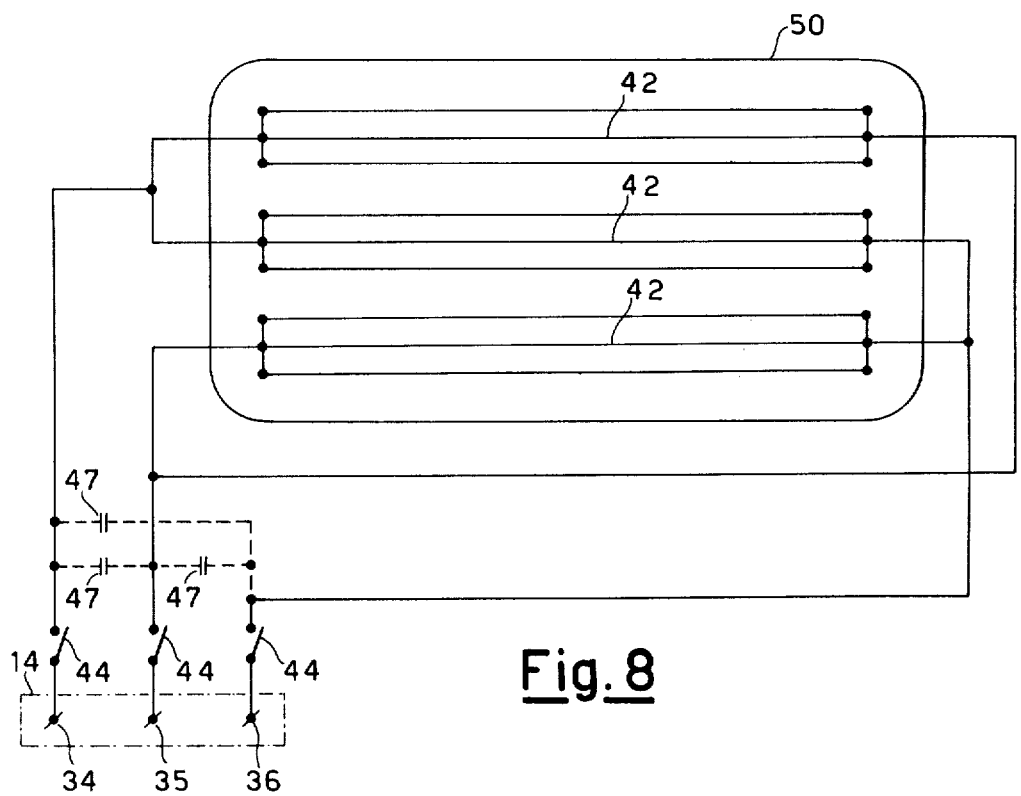

FIG. 8 depicts a schematic circuit diagram which is similar to that shown in FIG. 7, with the exception that the wire leads 42 thereof being delta-connected.

As outlines above, the first set of selective electrical-power consuming devices are connected to the D.C. circuitry at terminals 15 and 6 of the terminal board 14. The second set of electrical-power consuming devices are connected to terminals 27 and 28 of the same terminal board which is fed with a constant and regulated alternating voltage, thereby providing certain vehicle loads such as the heating resistors in the glass windows of the vehicle to be driven from alternating current supplied from the vehicle alternator rather than by direct current supplied from the storage battery so as to reduce the total load assumed by the same. In a three-phase alternator, the second set of selected electrical-power consuming devices are connected to terminals 34, 35 and 36 of the terminal board.

What is claimed is:

1. In an electrical installation for a motor vehicle powered by an internal combustion engine which permits the connection thereto of selected electrical-power consuming devices of the vehicle operated directly from a constant and regulated alternating current supplied from an A.C. alternator, the improvement comprising, in combination:

an A.C. alternator driven by the engine and having a controllable D.C. field excitation winding;

a voltage regulator associated with said controllable D.C. field excitation winding for maintaining the output of said A.C. alternator at a constant and regulated voltage;

a storage battery connected to be charged by said A.C. alternator at a constant and regulated voltage;

a storage battery connected to be charged by said A.C. alternator through current rectifying means;

a first set of said selected electrical-power consuming devices connected directly to the battery;

a second set of said selected electrical-power consuming devices comprising heat generating resistors embedded in a transparent window material for the motor vehicle and connected directly to the constant and regulated alternating current supplied from A.C. generator, thereby effecting operation of said second set of said selected electrical-power consuming devices by the output voltage of said A.C. alternator which is regulated and held constant irrespective of the speed of said A.C. alternator and thereby elmininating the risk of discharge of said battery by reducing the number of selected electrical-power consuming devices connected to said battery; and wherein capacitors coupled in parallel with said resistors are provided for correcting the power factor.

* * * * *